United States Patent [19]

Kawada et al.

[11] Patent Number: 4,814,923
[45] Date of Patent: Mar. 21, 1989

[54] CASSETTE CONDITION INDICATING DEVICE

[75] Inventors: Hideaki Kawada, Kanagawa; Hideo Kawamoto, Tokyo, both of Japan

[73] Assignee: Sony Corporation, Tokyo, Japan

[21] Appl. No.: 105,992

[22] Filed: Oct. 7, 1987

Related U.S. Application Data

[63] Continuation of Ser. No. 757,879, Jul. 23, 1985, abandoned.

[30] Foreign Application Priority Data

Jul. 23, 1984 [JP] Japan ................................ 59-152603

[51] Int. Cl.⁴ .......................................... G11B 23/02
[52] U.S. Cl. ......................................... 360/132; 360/60
[58] Field of Search ................. 360/132, 60, 96.5, 93, 360/66, 69; 242/197, 199, 200

[56] References Cited

U.S. PATENT DOCUMENTS

| 3,686,470 | 8/1972 | Stahlberg et al. | 360/132 |
| 4,012,011 | 3/1977 | Saito | 360/132 X |
| 4,041,537 | 8/1977 | Kishi | 360/60 |
| 4,607,299 | 8/1986 | Oishi et al. | 360/132 X |
| 4,703,384 | 10/1987 | Kawada et al. | 360/132 |
| 4,743,984 | 5/1988 | Ryan | 360/132 X |

FOREIGN PATENT DOCUMENTS

| 0139181 | 5/1985 | European Pat. Off. | 360/132 |
| 0146067 | 8/1983 | Japan | 360/132 |
| 0218085 | 12/1983 | Japan | 360/132 |

Primary Examiner—Robert S. Tupper
Assistant Examiner—Andrew L. Sniezek
Attorney, Agent, or Firm—Alvin Sinderbrand

[57] ABSTRACT

In a cassette which comprises a housing having spaced top and bottom walls and a side wall extending between the top and bottom walls along a substantial portion of the housing and an aperture formed in one of the walls and through which, during a recording and/or reproducing operation, access is had to a recording medium that is movably disposed within the housing, the housing having a positioning opening in the bottom wall for receiving a positioning pin therein when the cassette is disposed in an operative position in a recording and/or reproducing apparatus; the cassette having, for indicating a specific condition of the cassette, a connecting hole formed in the housing in communication and alignment with the positioning opening, and a plug element which is slidably inserted in the connecting hole, with the specific condition of the cassette being indicated by the position of the plug element.

5 Claims, 3 Drawing Sheets

CASSETTE CONDITION INDICATING DEVICE

This is a continuation of application Ser. No. 06/757,879, filed July 23, 1985 now abandoned.

FIELD OF THE INVENTION

This invention relates to a magnetic tape cassette to be loaded into and used with a magnetic tape recorder (VTR) and, more particularly, is directed to a device for indicating a specific condition of the tape cassette.

DESCRIPTION OF THE PRIOR ART

In prior-art tape cassettes, in providing information necessary for preventing inadvertent erasure of the tape in a cassette, a partial cut-out is formed in the main body of the cassette housing to define a tab which can be broken along a weakened edge, or an opening is formed in the bottom surface of the tape cassette and is blocked by a removable cap.

In the former method, since the tab defined by the cut-out is broken away once and for all, the resulting opening has to be blocked, for example, by a strip of adhesive tape, whenever re-recording is desired. It is also difficult to check whether or not the tab is broken away to inhibit inadvertent erasure.

In the case of the opening block by a cap, the latter, when removed from the cassette, may be lost or missing. It is also difficult to check whether the cap is in position in the cassette, since the opening for receiving the cap is formed in the bottom surface of the cassette.

As means for obviating these inconveniences, a recently developed small size tape cassette has a detection opening provided at the corner of the cassette top wall so as to be opened or closed by a movable plug element disposed on the cassette label surface.

This arrangement is excellent in respect to the ease in switching and the ease in confirming the switching state. It is however not practical with a series of tape cassettes of different sizes since the label side cassette corner is not at the same spot with respect to the VTR so that the sensor for detecting the plug element has to be shifted for each size of the cassette.

OBJECTS AND SUMMARY OF THE INVENTION

It is a principle object of this invention to provide a tape cassette with an arrangement for indicating a specific condition, for example, that the tape or other record medium has been recorded with material that is not to be erased, and which satisfies the following requirements: In the case where more than two different cassette sizes are provided with the reel diameter and the outer size of the cassettes being different for different tape lengths, and interchangeability is possible between the different sized cassettes, the cassette condition indicating arrangement is such that (a) for providing a simpler structure of the apparatus, such as VTRs or tape recorders, the condition indicating position of the tape cassette is at a common position irrespective of the difference in the outer size of the cassettes;

(b) the indication can be switched easily from one to the other of the states; and (c) The indicated state can be confirmed easily.

In accordance with an aspect of the present invention, a plug element is slidable within a continuation of a reference or positioning opening provided in a common position on the housings of two or more kinds of interchangeable tape cassettes having different outer sizes.

According to a feature of the present invention, the height of the plug element enclosed within the condition of the positioning opening in the cassette can be changed for indicating the specific condition of the cassette. The cassette information is derived by a sensor associated with a positioning pin of the VTR for sensing these plug positions.

DESCRIPTION OF A PREFERRED EMBODIMENT

Figure 1:
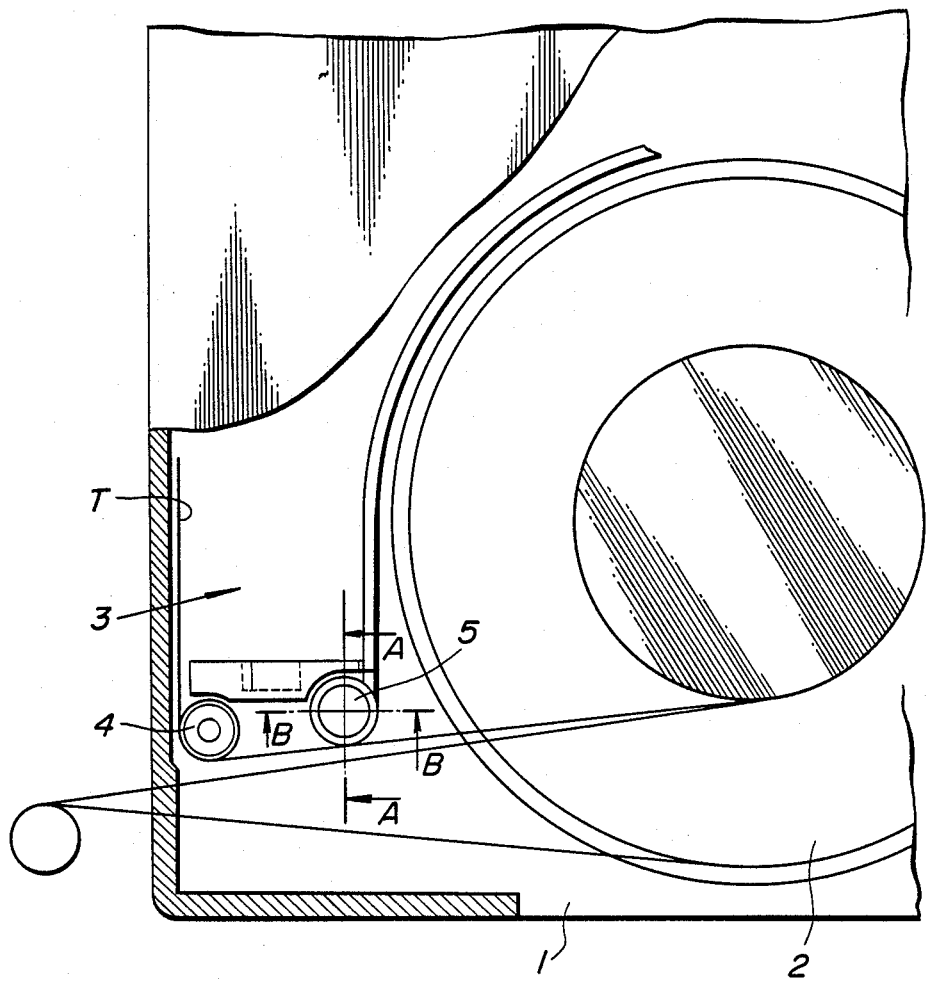
FIG. 1 is a fragmentary plan view, partially cut away, of the tape cassette according to the present invention.

A preferred embodiment of the present invention is now described in detail with reference to the accompanying drawings.

A tape cassette 1 contains a pair of tape reels 2, only one of which is shown, and which are rotatable in juxtaposition to each other. The numeral 3 designates a threading area normally closed by a lid, not shown, and opened during loading into a video tape recorder. Within the threading area 3, there may be disposed a tape extracting arm, not shown, of the video tape recorder, for extracting a tape T travelling between a pair of reels and for urging the tape into sliding contact with the recording and/or reproducing head of the video tape recorder. In the drawings, the numerals 4 and 5 designate a tape guide and a tape cassette positioning opening, respectively.

Figure 2:
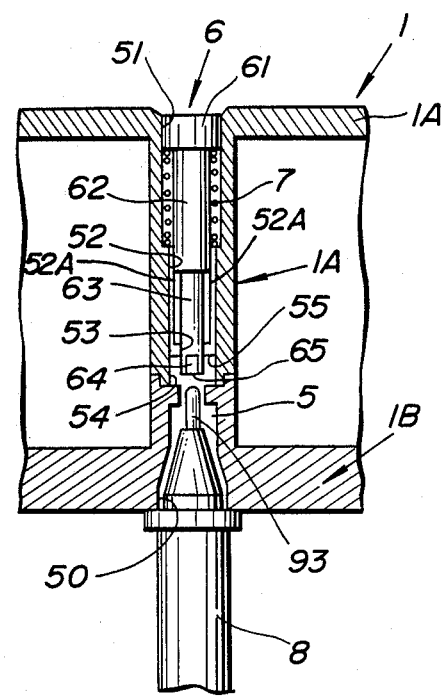
FIG. 2 is a sectional view taken along line A—A of FIG. 1.
Figure 3:
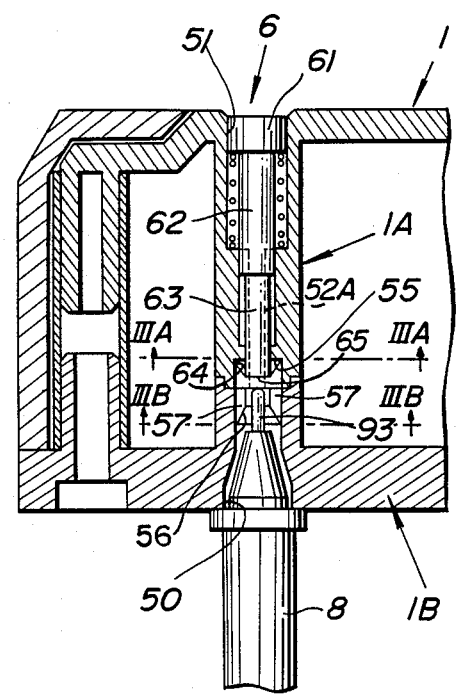
FIG. 3 is a sectional view taken along line B—B of FIG. 1, with a plug element being shown at a higher position within the positioning opening.
Figure 3A:
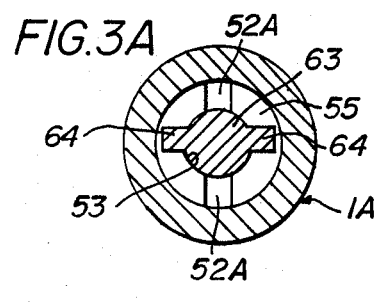
FIGS. 3A and 3B are enlarged sectional views taken along the lines IIIA—IIIA and IIIB—IIIB, respectively, on FIG. 3.
Figure 3B:
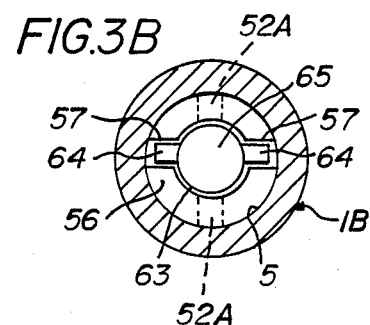
Figure 4:
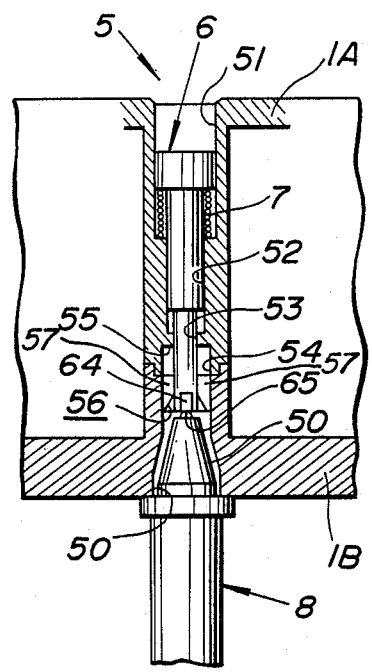
FIG. 4 is a sectional view similarly taken along line B—B of FIG. 1 but with the plug element being shown in a lower position within the positioning opening.

Referring to FIGS. 2 to 4, it will be seen that the opening 5 has a larger diameter section 52, a lesser diameter section 53 and a profiled section 54, in communication with each other, starting from the upper end. The opening 5 is terminated, at its lower end by a reference section 50.

A plug element 6 is fitted for sliding vertically in opening 5, and is normally biased upward in the drawings by a spring 7.

The plug element 6 is formed in succession by a larger diameter head portion 61, a medium diameter shank portion 62, and a lesser diameter shank portion 63, starting from the upper end. The lower end of the lesser diameter shank portion 63 is formed with a pair of diametrically opposed finger portions 64 projecting radially therefrom.

Within the opening 5, the larger diameter head portion 61 is slidably engaged in an increased diameter counter-bored section 51, the medium diameter shank portion 62 is slidingly guided through the medium diameter section 52, and the lesser diameter shank portion 63 is passed through the lesser diameter section 53. The engaging finger portions 64, 64 at the lower end of the shank portion 63 are movable in profiled section 54 and may be selectively engaged with a downwardly facing step 55 contiguous to the lesser diameter section 53, as shown in FIGS. 2 and 3, or with a step 56 at the lower end portion of the profiled section 54.

In switching from the upper to the lower engaging position of the finger portions 64 in the profiled section 54, the plug element 6 disposed in the position shown in FIGS. 2 and 3 is pushed down in the opening 5 against the force of the spring 7 until the finger portions 64, 64 are moved towards the lower end of the profiled section 54. The plug element 6 is then turned 90° about its axis until the finger portions 64, 64 are engaged with the lower end step 56 of the profiled section 54, as shown in FIG. 4, to inhibit restoration of the plug 6 upward within the positioning opening 5. The described manipulation of the plug 6 may be conventionally effected, for example, by means of a screw driver or similar bladed tool engaged with a slot (not shown) in the head portion 61.

In switching the plug element 6 from the state of FIG. 4 to the state of FIG. 2 or 3, the plug element 6 is turned 90° about its axis from the state shown in FIG. 4 so that the finger portions 64 are disposed within slits 57 in the profiled section 54 of the opening 5 so as to be raised within the opening 5 by the resilience of the spring 7.

In this manner, by switching the plug element 6 between the position shown in FIGS. 2 and 3 and that shown in FIG. 4, the lower end 65 of the plug element 6 in the opening 5 can be displaced axially for changing or switching the depth of the lower end 65 from the opening end of the reference section 50.

The video tape recorder has a reference or positioning pin 8 for engaging in the reference section 50 of the opening 5 for positioning the tape cassette.

Figure 5:
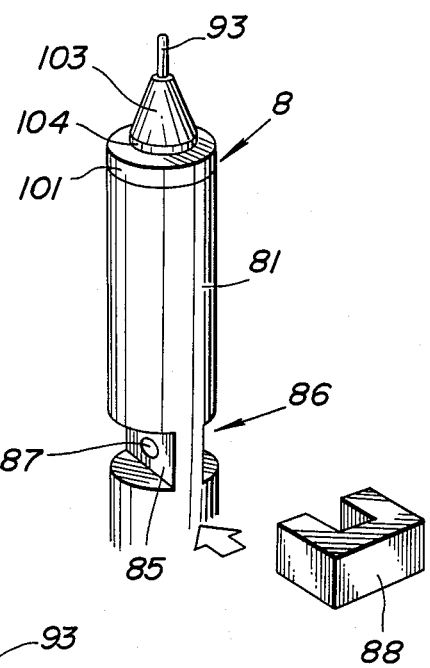
FIG. 5 is a perspective view showing an example of a detection pin.
Figure 6:
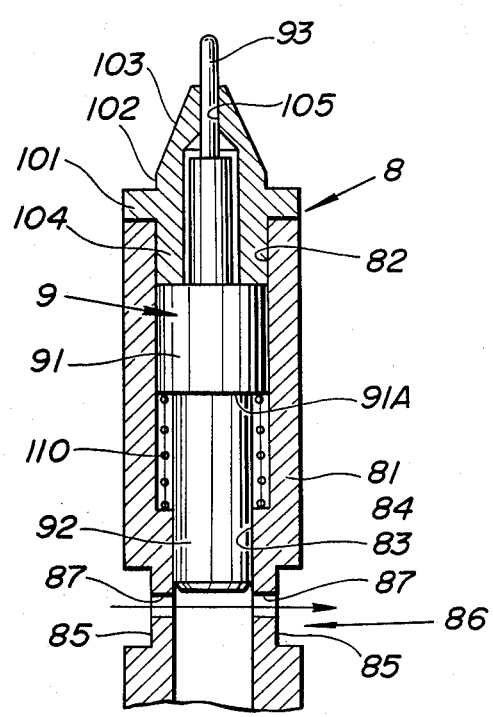
FIG. 6 is an enlarged longitudinal section through the detection pin.

The reference pin 8 is constructed as shown in FIGS. 5 and 6. As shown in these figures, an outer sleeve 81 has a hollow interior having an upper larger diameter section 82, and a stepped section 84 leading to a lower lesser diameter section 83. Within the interior of the sleeve 81 is desposed a sensor member 9 having an intermediate larger diameter portion 91 slidably disposed within the larger diameter section 82, a lower shutter shank portion 92 slidably disposed within the lesser diameter section 83 and an upper sensor portion 93. On the top of the sleeve 81 is disposed a cap having an intermediate flange portion 101, a reference shank portion 102 and a taper shank portion 103 above the flange portion 101, and an engaging portion 104 engaging in the upper end of the sleeve 81. The cap has an axial through-hole 105 for guiding the sensor portion 93. Within the sleeve 81, a spring 110 is interposed between the lower end surface 91A of the larger diameter portion 91 and the step 84 for normally urging the sensor member 9 upwards or in the direction for causing projection of the sensor portion 93 from the taper shank portion 103 of the cap. A pair of chordal cuts 85 are formed in the diametrically opposed sides of the peripheral portion of the sleeve 81 corresponding to the lesser diameter section 83 for defining a recess 86. Radial through-holes 87 are bored outwardly from lesser diameter section 83 to open into cuts 85 so that, when a sensor 88 is mounted within the recess 86, a light emitting element and a light receiving element (not shown) within sensor 88 are disposed in opposition to each other through these through-holes 87. The sensor 88 may be of the optical or mechanical type, as desired. In the present embodiment, with the sensor member 9 in the upper position within the sleeve 81, the through-holes 87, 87 are in communication with each other via the lesser diameter section 83 and, when the sensor member 9 is pushed down against the force of the spring 110, the through-holes 87, 87 are blocked-off from each other by the shutter shank portion 92.

The operation of sensing the condition of the cassette 1 is now explained by referring again to FIGS. 2 to 4.

With the plug element 6 in the upper position within the opening 5, as shown in FIGS. 2 and 3, the foremost end of the sensor portion 93 of the positioning pin 8 does not reach the lower end 65 of the plug element 6 when the tape cassette is set in position within the VTR. This means that the sensor member 9 can remain in the upper position for leaving unobstructed the light path for the sensor 88.

When the plug 6 is moved to and held at the lower position in the opening 5, as shown in FIG. 4, the sensor portion 93 of the positioning pin 9 is abutted and pressed down by the lower end 65 of the plug element 6 in response to the operative positioning of the tape cassette 1 on the positioning pin 8 in the VTR. This causes the sensor member 9 to be pressed down as one with the sensor portion 93 so that the light path for the sensor 88 is interrupted by the shutter shank portion 92, whereby the specific condition of the cassette represented by the lower position of plug 6 can be indicated by the signals supplied from the sensor 88.

In mounting the plug element 6 within the opening 5 of the cassette 1, the coil spring 7 is disposed on the shank portion 62 of the plug element and the spring-plug assembly is introduced into the opening 5 with registration, in the rotational sense, between longitudinal slits 52A extending along sections 52 and 53 at diametrically opposed locations in the plug housing and the finger portions 64, 64 of the plug element 6. The spring-plug assembly is then turned 90° about its axis for temporarily engaging the finger portions with the step 55 contiguous to the lesser diameter section 53 of the opening 5 of the upper cassette half 1A. When the upper and lower cassette halves 1A, 1B are abutted and connected to each other, the slits 52A are stopped by the lower half 1B to inhibit disengagement of the spring-plug assembly from the cassette 1. Also, with the plug element attached to the upper cassette half 1A, as shown in FIGS. 2 and 3, the lower cassette half 1B may be abutted to the upper half, and the plug 6 may then be pressed down in this state as shown in FIG. 4, for engaging the finger portions 64 with the lower step 56 in the lower cassette half 1B. In this manner, the upper and lower cassette halves 1A, 1B can be temporarily connected together by the plug element 6 so that assemblying of the cassette halves can be facilitated.

The indication of the cassette condition can be switched easily by simply changing the height or position of the plug element.

Although a specific embodiment of the invention has been described in detail herein with reference to the accompanying drawings, it is to be understood that the invention is not limited to that precise embodiment, and that various changes and modifications could be effected therein by one skilled in the art without departing from the scope or spirit of the invention as defined in the appended claims.

What is claimed is:

1. A cassette comprising a housing having spaced top and bottom walls and a side wall extending between said top and bottom walls along a substantial portion of the housing and an aperture formed in one of said walls and through which, during a recording and/or reproducing operation in an apparatus therefor, access is had to a recording medium movably disposed within said housing, said housing have a positioning opening in said bottom wall for receiving a positioning pin therein in an operative position of said cassette in said apparatus, said cassette further having a connecting hole formed in said housing in communication and alignment with said positioning opening and opening through said top wall, a plug element which is slidably inserted in said connecting hole for axial and rotational movements between relatively high and low positions which respectively correspond to first and second conditions of the recording medium within said housing so that said plug element indicates one of said conditions by its position in said connecting hole, said plug element including a relatively large diameter portion at one end thereof which slidably engages with an inner surface of said connecting hole and a relatively small diameter portion at another end thereof which extends into said positioning opening for engagement with the positioning pin therein when said plug element is in said low position, at least one radially extending finger portion at said relatively small diameter portion, and axially spaced shoulder portions in said connecting hole engageable by said finger portion for holding said plug element in said relatively high and low positions, respectively, said shoulder portions having respective slits through which said finger portion of said plug element can pass, said slits in said axially spaced shoulder portions being angularly displaced from each other, whereby said finger portion may be engaged with a shoulder portion or made to pass through the respective slit therein by rotation of said plug element through a predetermined angle.

2. A cassette according to claim 1; wherein spring means is provided in said connecting hole and acts against said large diameter portion for urging said plug element upwardly.

3. In an apparatus for recording and/or reproducing signals on a recording medium movable in a cassette housing having top, bottom and side walls with a positioning opening in said bottom wall, said apparatus including a positioning pin received in said positioning opening for operatively positioning said cassette housing during said recording and/or reproducing of signals; the combination of a connecting hole opening upwardly through said top wall of the cassette housing and being aligned, and communicating with said positioning opening, a plug element slidable in said connecting hole, between first and second axially displaced positions in said connecting hole which respectively correspond to first and second conditions of the recording medium in the respective cassette housing, and sensor means associated with said positioning pin and being engageable by said plug element of the cassette housing in said operative position for detecting in which of said first and second axially displaced positions said plug element is disposed.

4. A cassette comprising a housing for a recording medium including upper and lower housing portions having top and bottom walls, respectively, and upper and lower boss-like structures extending from said walls and abutting axially in alignment with each other within the housing when said upper and lower housing portions are assembled together, the abutting boss-like structures defining a bore extending axially therethrough and opening, at its opposite ends, through said top and bottom walls, respectively, a plug element axially and rotationally slidable in said bore for movements between relatively high and low positions which correspond to respective conditions of the cassette so that said plug element indicates one of said conditions by its position in said bore, said plug element including an elongated shank and at least one radiallyh extending finger adjacent a lower end of said shank, said upper boss-like structure defining a downwardly facing upper shoulder in said bore engageable from below by said finger for defining said relatively high position of the plug element, said upper boss-like structure further having an internal axial groove opening through said upper shoulder and through which said finger can travel axially when inserting and removing said plug element through the end of said bore opening through said top wall, and said lower boss-like structure defining a downwardly facing lower shoulder in said bore engageable from below by said finger for defining said relatively low position, said lower boss-like structure further having an internal axial groove opening through said lower shoulder and through which said finger can travel for movement of said plug element between said low and high positions, said axial groove in said lower boss-like structure being angularly displaced in respect to said axial groove in said upper boss-like structure.

5. A cassette according to claim 4; further comprising spring means urging said plug element axially in the direction toward said high position.

* * * * *